United States Patent Office 2,996,817
Patented Aug. 22, 1961

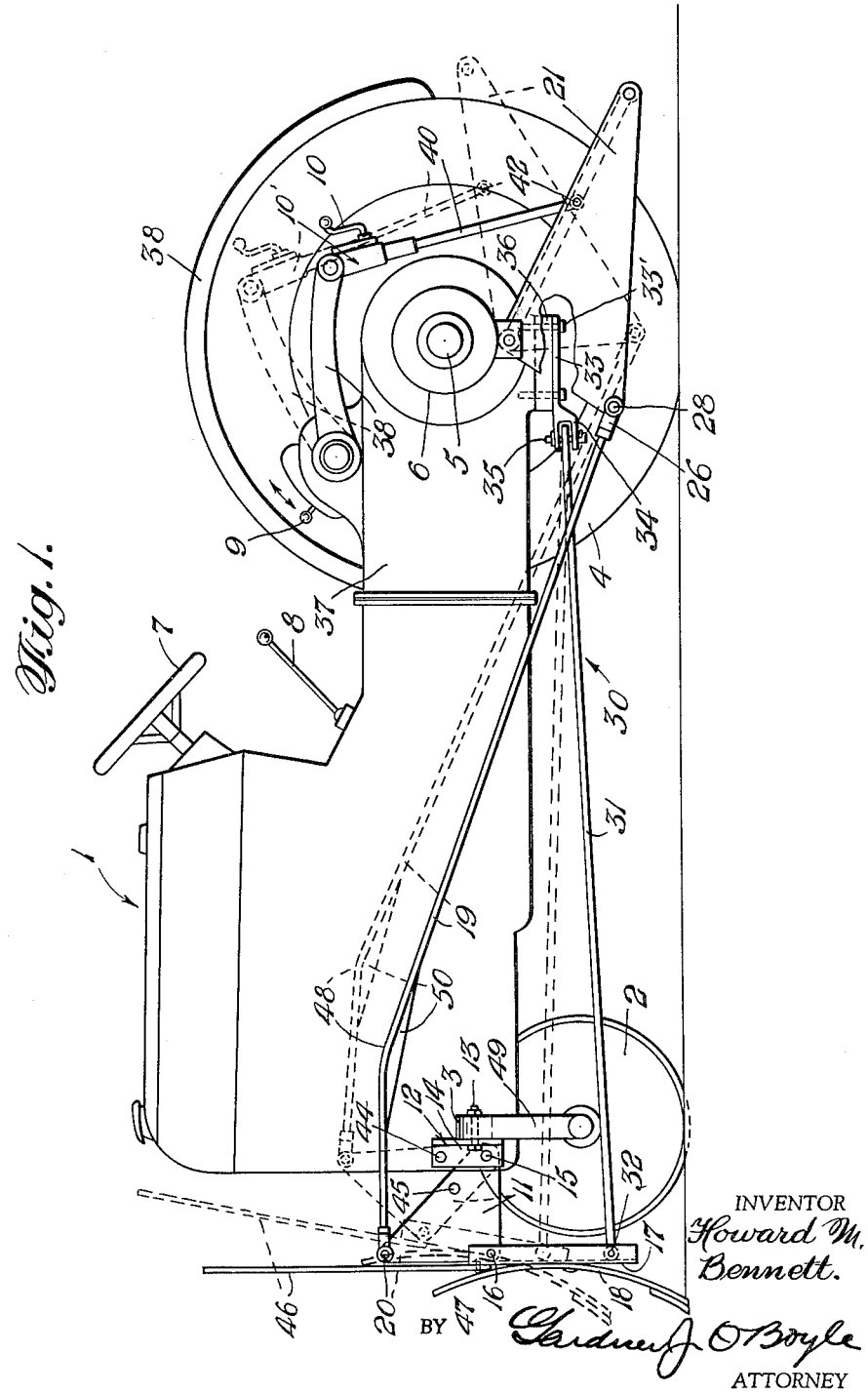

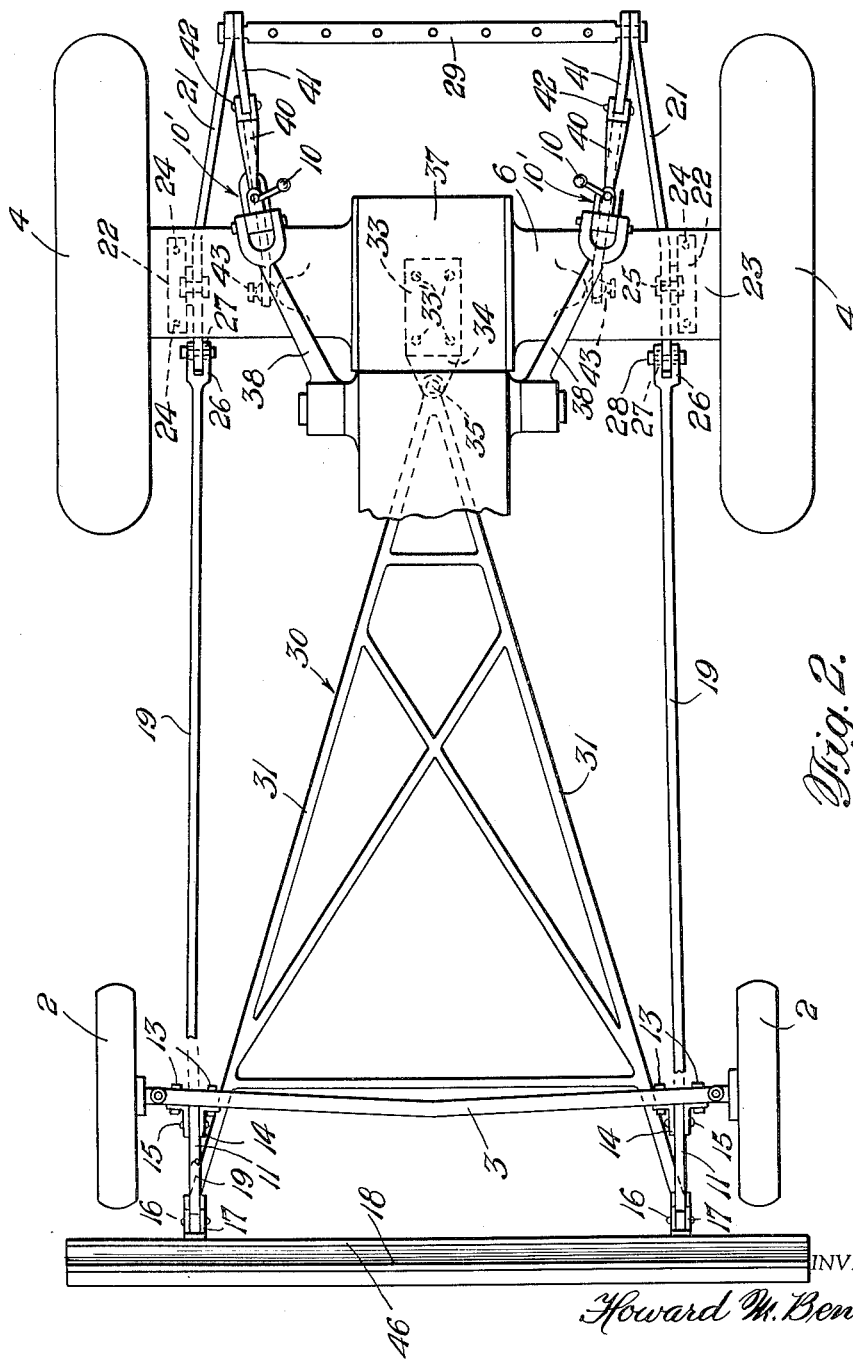

2,996,817
TRACTOR BLADE OPERATING ARRANGEMENT
Howard M. Bennett, Rte. 3, Box 439, Grants Pass, Oreg.
Filed June 18, 1957, Ser. No. 666,437
5 Claims. (Cl. 37—144)

My invention relates to an attachment for tractors, and more particularly an improved arrangement for operatively supporting a bulldozer blade or other implement at the front end of a conventional tractor.

An object of my invention is to provide an improved attachment for supporting a bulldozer blade or other implement on a tractor.

Another object of my invention is to provide an improved arrangement for operatively supporting a bulldozer blade or other implement at the front end of a tractor.

Yet another object of my invention is to provide an improved arrangement for operatively supporting a bulldozer blade or other implement on a conventional tractor, wherein the blade or other implement is actuated by means of the hydraulic system of the tractor.

Still another object of my invention is to provide an improved arrangement for operatively supporting a bulldozer blade on a tractor, the blade supporting means and actuating mechanism therefor being constructed and arranged so as not to disturb the tractor balance nor interfere with the tractor operating mechanism and associated controls.

A further object of my invention is to provide an improved attachment designed to operatively support a bulldozer blade on a tractor, wherein the blade, when not in use, may be locked in the up-position, whereby to permit use of the tractor with other implements, for example, cultivators, plows, discs, or other hitches connected to the rear of the tractor.

Yet a further object of my invention is to provide an improved attachment for tractors which may be easily and quickly applied to or removed from a tractor, said attachment being strong and rugged in construction, consisting of relatively few parts, and not liable to get out of order even after long and continued use.

With these and other objects in view, which may be incident to my improvements, the invention consists in the parts and combinations to be hereinafter set forth and claimed, with the understanding that the several necessary elements, comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings:

FIGURE 1 is a side elevational view of a tractor equipped with the attachment of the present invention, showing a bulldozer blade in operative position at the front end of a tractor; and FIG. 2 is a plan view of the tractor and blade of FIG. 1, with portions of the tractor super-structure removed, showing the mounting arrangement of the attachment and the blade actuating means associated therewith.

Referring to the drawings, and more particularly to FIG. 1, there is shown a tractor 1, having a conventional running gear, including steerable front wheels 2, mounted upon a suitable axle 3, rear driving wheels 4, and their associated axle 5, together with a rear axle housing 6. The tractor is further provided with the usual controls for the operator, including a steering wheel 7, gear shift lever 8, hydraulic control lever 9, and leveling cranks 10 for the leveling devices 10'. The bulldozer blade mounting arrangement, and the blade actuating mechanism, comprises a pair of right triangular shaped plates 11 pivotally mounted in brackets 12, secured to the front face of the front axle 3, by means of bolts 13 or other suitable fastening means. Each of the brackets 12 is formed with spaced arms 14 (FIG. 2) adapted to receive an end portion of a plate 11 in the vicinity of one vertex at the base thereof, the plates being attached to the arms by means of pivot pins 15, adapted for insertion through openings in the plates and through registering openings formed in the arms. The opposite vertex portions at the bases of the plates are pivotally attached as at 16, to channel bars 17, secured to the rear of the bulldozer blade 18, the plates being pivotally connected at their remaining vertex portions to operating rods 19, by means of pins 20. A pair of similar triangular shaped plates 21 are pivotally mounted on brackets 22, secured to the underside of the rear axle housing 23 by means of bolts 24, the brackets being standard equipment on most tractors for use in connecting various implements thereto, such as mowing machines, posthole diggers and other devices. The plates are pivotally attached to the brackets by pins 25, and to the operating rods 19 by means of a U-type connection to enable a straight pull on the rods, the forked ends 26 of the rods receiving vertex portions of the plates therebetween, said portions having thimble spacers 27 welded thereto and through which securing pins 28 are inserted. The remaining vertex portions of the plates are secured to the ends of a draw bar 29, as shown in FIG. 2.

Attached to the underside of the rear axle housing and to the channel bars 17 of the blade 18, is an A-frame, designated generally by numeral 30 (FIG. 2). The ends of the legs 31 of the frame are secured to the lower portions of the bars by means of pins or bolts 32, and the upper end of the frame is attached to the draw plate 33, having a clevis 34 in which the end of the frame is retained by a pin 35. The draw bar plate 33, which is normally secured to the underside of the rear axle housing 23 by bolts 33' and positioned in an opposite direction to that shown, is reversed 180°, so as to face forward, and it is also lowered by means of a spacer member 36 a sufficient distance to provide clearance between the A-frame and the tractor gear housing 37. The draw plate is standard equipment with most tractors, and can readily be installed on other models not so equipped. It will thus be seen that the blade mounting arrangement, as above described, is attached to the tractor at five locations, namely, by the two brackets attached to the front axle, two brackets on the rear axle housing, and at the draw bar position in the center of the tractor below the rear axle housing.

As indicated hereinabove, actuation of the blade, that is to say, vertical movement thereof with respect to the horizontal, and tilt of the blade is effected by the conventional hydraulic system and leveling devices of the tractor. As will be seen in FIG. 2, the lift arms 38 of the tractor hydraulic system are connected through leveling devices 10' and associated arms 40 to the lower arms or links 41, as at 42, the links being pinned underneath the rear axle housing at 43, and having their opposite ends attached to the draw bar 29, in accordance with customary practice. While only one leveling device is usually provided for raising or lowering one of the links 41, whereby to level mounted implements to give desired performance, increased tilt of the blade may be obtained by the addition of a second leveling device, as shown.

In accordance with the above described arrangement, full control of the blade 18 at all times is by means of the actuating lever 9 of the tractor hydraulic power mechanism. When lever 9 is moved rearwardly of its position shown in FIG. 1, the arms 38 are caused to move upwardly and raise the lower arms 41. Since these arms are tied together by the draw bar 29, which is attached to the triangular shaped plates 21, said arms being pinned to the underside of the rear axle housing on the same center line as the plates and of equal radial length therewith, the operating rods 19 are pulled backwardly by the plates. Movement of the rods in a backward direction exerts a pull on the forward plates 11 causing the plates to move upwardly about their pivot pins 15, thus raising the channel bars 17 and attached blade 18 vertically upward in a substantially straight line. The above described operation of the blade actuating mechanism is reversed when the hydraulic control lever 9 is moved to the position for lowering the lift arms 38. As the arms 38 move downwardly, the rods 19 are pushed forward by the plates 21, thus moving plates 11 to their full line positions, as shown in FIG. 1, whereby the blade is lowered.

The blade can be raised or lowered at any speed, or stopped, as desired by the operator. It will be noted that the bulk of the load on the blade is approximately in a direct line with the draw bar plate 33, and accordingly, the tractor balance is not disturbed, causing loss of traction at the rear wheels, or raising of the front wheels from the ground, when the tractor is operated under loaded blade conditions. By reason of the fact that the load on the blade is slightly below the front ends of the legs 31 of the A frame 30, the upper part of the blade, when loaded, is pulled forward a short distance thus taking all strain from the front axle and the blade operating elements. Additionally, by having a forward pull on the upper part of the blade when it is under load, instead of a push back on the front plates 11, which would cause the blade to raise and unload itself, the sensitivity of the blade operation by the control lever 9 of the hydraulic mechanism is increased.

The blade 18 may be tilted at a desired angle to the horizontal by means of leveling devices 10'. As indicated hereinabove, one of these devices is furnished as standard equipment on most tractors, and is usually located to the right of the operator, in back of the tractor seat, not shown. When the leveling device adjusting handle 10, to the right of the operator, is turned in a direction to shorten the device, arm 40 at the rear right of the tractor will be raised, causing the adjacent plate 21 to raise and exert a pull on its associated actuating rod 19, thus lifting the right hand side of the blade. To lower the same side of the blade, the leveling device is lengthened, causing the plate to lower and push the operating rod 19 forward, whereby the blade is lowered. The blade tilt can be increased by adding a second leveling device 10' between the lift arm 38 on the left side of the tractor and the arm 41 on the same side. The second leveling device can be readily installed by removing the straight rod or link normally used to connect the arms 38 and 41, when only one leveling device is used, and substituting therefor the leveling device 10', as shown. With this arrangement, when one of the leveling devices is shortened, the device on the opposite side will be lengthened, and the blade will have a more pronounced tilt.

The entire blade arrangement can be held in the upper position, with maximum ground clearance under the blade, by means of pins 44, insertable through openings 45 formed in the front plates 11, and through registering openings at the top portions of the spaced arms 14 of the brackets 12, as shown in the dotted line position of one of the plates, in FIG. 1. By disconnecting the angle lift plates 21 from the draw bar 29 (FIG. 2), the draw bar and lower arms or rods 41, are free for connection to other implements, such as cultivators, plows, discs or other hitches which are normally connected to the rear of the tractor.

It has been found, in the use of the improved blade arrangement, that the tractor is highly maneuverable, and responds in the same fashion as it does in normal operation without the blade attachment. It will be noted that the blade is mounted close to the front wheels of the tractor, keeping the blade and front wheels on the same plane, for sensitive and accurate control. The blade is provided with a removable guard member 46, bolted to the push channels 17, as at 47 (FIG. 1), the guard being designed to protect the tractor radiator against damage when moving debris, clearing land, or the like. Weights, not shown, may be added to the blade for special digging operations, and wings may also be attached to the blade for moving light bulky materials.

The blade mounting and actuating arrangement of the present invention may be quickly and easily installed on a tractor without interference with the tractor mechanism. In this connection it will be noted that each of the actuating rods 19 is formed with a bend 48 to provide clearance for the tractor steering rods, which rods attach to the front wheel spindles 49 and extend rearwardly to the steering gear box of the tractor located under the rods 19. In order to stiffen and reinforce the rods in the vicinity of the bends, suitable gussets 50 are secured to the rods below the bent portion thereof.

As indicated hereinabove, the blade operating mechanism is constructed and arranged to eliminate stress and strain on the front axle of the tractor and on the operating parts of the blade actuating mechanism. The resultant of the forces acting on the brackets 12 of plates 11 is forward rather than back against the front axle, due to the fact that the load on the blade is below the push-points of the legs 31 of the A frame against the blade, thus throwing the upper part of the blade forward, and putting all of the strain on the draw bar plate 33, which was originally designed for heavy loads.

The arrangement for mounting and actuating the blade, as described hereinabove, consists of relatively few parts, which parts, when assembled, form a strong and rugged piece of equipment designed to withstand the rough usage frequently encountered in actual use of a tractor. After the brackets used to support the parts have been permanently installed on a tractor, the blade arrangement may be attached or removed from the tractor in a matter of a few minutes.

In the foregoing description of the invention herein, reference has been made to its use for mounting and actuating a bulldozer blade, however, it is to be understood that the invention is not limited to this specific use. The present invention also comprehends use of the mounting and actuating arrangement for front end mounting of various other implements, such as a fork-lift, buck rake, and like devices.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

I claim:

1. A bulldozer blade mounting and actuating arrangement of the character described, comprising a pair of channel bars, an A-shaped frame, including divergent leg members, the forward end of each of said members being connected to the channel bars, with the legs extending inwardly and rearwardly of the bars, a first pair of triangular shaped plates, including a mounting bracket for each plate, each of said plates having a vertex portion pivotally mounted on its associated bracket, the opposite vertex portions at the bases of the plates being severally pivotally connected to the channel bars, a second pair of triangular shaped plates including mounting brackets therefor, each of said plates having vertex portion pivotally mounted on its associated bracket, and means connecting the plates for simultaneous movement about their pivot points on the brackets, said means comprising a pair of actuating rods, the ends of the rods being severally pivotally connected to the third vertex portion of said first pair of plates and to the vertex portions of said second pair of plates.

2. A bulldozer blade mounting and actuating arrangement of the character described, comprising a pair of channel bars, an A-shaped frame, including divergent leg members and a vertex portion at the juncture of the legs, the forward end of each of the legs being attached to the lower portions of the channel bars, with the vertex portion of the frame extending rearwardly of the bars, a first pair of right triangular shaped plates, including a mounting bracket for each plate, each of the plates having a vertex portion pivotally mounted on its associated bracket, the opposite vertex portions on the same legs of the triangular plates being severally connected to the channel bars in the vicinity of the top portions thereof, a second pair of right triangular shaped plates, including mounting brackets therefor, each of said plates having a vertex portion pivoted on its associated bracket, and means connecting the plates for simultaneous movement about their pivot points on the brackets, said means comprising a pair of actuating rods having their ends severally connected to the third vertex portion of said first pair of plates and to the vertex portions of the second pair of plates on the same leg as the pivot points of these plates.

3. In combination with a tractor having hydraulic power lift means, including a pair of lift arms operatively connected to draw bar links having a draw bar therebetween, a front axle, a rear axle and associated housing, and a draw plate secured underneath the housing centrally of the length thereof; a bulldozer blade positioned at the front of the tractor, means for operatively mounting the blade on the tractor, comprising a pair of channel bars attached to the rear surface of the blade in spaced relation with respect to the length of the blade, an A-shaped frame including divergent leg members and a vertex portion, the forward end of each of said leg members being connected to the channel bars, the vertex portion of the frame being connected to the draw plate, a pair of brackets secured to the front axle of the tractor in line with the channel bars, each bracket having a triangular shaped plate pivotally moutned at a vertex portion therein, the opposite vertex portions at the bases of the plate being severally pivotally connected to the channel bars, a second pair of brackets mounted underneath the rear axle housing, each of said brackets having a triangular shaped plate pivotally mounted at a vertex portion therein, the opposite vertex portions at the bases of the plates being tied with the draw bar links to the ends of the draw bar, and means connecting the plates for simultaneous movement about their pivot points on the brackets, said means comprising a pair of actuating rods having their ends severally pivotally connected to the remaining vertex portions of the pairs of plates, whereby upon actuation of tractor hydraulic power mechanism to lift or to lower draw bar links, the blade is correspondingly raised or lowered.

4. A tractor and blade mounting and operating arrangement according to claim 3, wherein a leveling device is interposed between one of the lift arms of the hydraulic mechanism and its associated draw bar link, whereby to vary the tilt of the blade with respect to the horizontal.

5. A tractor and blade mounting and operating arrangement in accordance with claim 3, wherein means are provided in cooperation with the front brackets and their associated plates, for locking the blade in its up-position.

References Cited in the file of this patent

UNITED STATES PATENTS

| Number | Name | Date |
|---|---|---|
| 1,522,378 | McLeod et al. | Jan. 6, 1925 |
| 1,713,030 | Cummings | May 14, 1929 |
| 2,059,431 | Barrett et al. | Nov. 3, 1936 |
| 2,216,572 | Nichols | Oct. 1, 1940 |
| 2,446,136 | Jarmin | July 27, 1948 |
| 2,626,470 | Cook et al. | Jan. 27, 1953 |
| 2,633,164 | Kissner et al. | Mar. 31, 1953 |
| 2,673,504 | Richey | Mar. 30, 1954 |
| 2,749,825 | Hirasuna | June 12, 1956 |
| 2,754,738 | Brown | July 17, 1956 |
| 2,832,382 | Lahar | Apr. 29, 1958 |
| 2,862,315 | Blanchet | Dec. 2, 1958 |